(12) United States Patent
Zara et al.

(10) Patent No.: US 7,117,169 B2
(45) Date of Patent: Oct. 3, 2006

(54) METHOD FOR COUPLING AN ORDERING SYSTEM TO A MANAGEMENT SYSTEM IN A DATA CENTER ENVIRONMENT

(75) Inventors: Anna M. Zara, Menlo Park, CA (US); Sharad Singhal, Belmont, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 94 days.

(21) Appl. No.: 09/853,976

(22) Filed: May 10, 2001

(65) Prior Publication Data

US 2002/0169696 A1  Nov. 14, 2002

(51) Int. Cl.
G06Q 1/14 (2006.01)
G06Q 20/00 (2006.01)

(52) U.S. Cl. ............... 705/28; 705/23; 705/29; 705/22; 700/106

(58) Field of Classification Search ............ 705/28, 705/29, 7, 26, 22, 23; 707/1, 2, 200, 102; 700/95, 106, 107
See application file for complete search history.

(56) References Cited

U.S. PATENT DOCUMENTS 5,424,944 A * 6/1995 Kelly et al. ............... 705/28

2001/0007982 A1* 7/2001 Brown ..................... 705/28
2002/0032623 A1* 3/2002 Wheeler et al. ........... 705/28
2002/0032626 A1* 3/2002 DeWolf et al. ............ 705/35
2002/0111884 A1* 8/2002 Groat et al. .............. 705/28
2003/0055749 A1* 3/2003 Carmody et al. .......... 705/28
2004/0254863 A1* 12/2004 Jones et al. ............... 705/29

FOREIGN PATENT DOCUMENTS

JP  02058103 A  *  2/1990

OTHER PUBLICATIONS

"Bar coding system tracks telecommunications equipment". (Kentrox Industries Inc. distribution system) (Auto. ID Digest special section), Material Handling Engineering, vol. 44, No. 9, p. 76(2), Sep. 1989.*

* cited by examiner

Primary Examiner—F. Zeender
(74) Attorney, Agent, or Firm—Richard P. Lange

(57) ABSTRACT

A method including 1) generating an asset record in a management system database when an order for components of an asset corresponding to said asset record are ordered; and 2) tagging said asset when deployable with an asset identification (ID), said asset ID uniquely referring to said asset record.

20 Claims, 7 Drawing Sheets

METHOD FOR COUPLING AN ORDERING SYSTEM TO A MANAGEMENT SYSTEM IN A DATA CENTER ENVIRONMENT

FIELD OF THE INVENTION

The invention relates generally to processes for ordering, installing and managing products in a data center environment.

BACKGROUND

Companies and other large entities increasingly rely on distributed computing where many user terminals connect to one or more servers that are centrally located. These locations called "data centers" may be facilities owned by the company or may be supplied by a third-party. These data centers house not only computers, but may also have persistent connections to the Internet and thus, conveniently house networking equipment such as switches and routers. Web servers and other servers that need to be network accessible are often housed in data centers. Where a third-party owns the data center, the entity in question rents a "cage" or enclosure that has racks upon which component equipment, such as computers and routers, can be installed. It is also possible for the entity to simply lease the equipment from the third-party owning the data center, or from another third-party which has leased space from the data center operator. In any case, the data center is usually divided into a number of predefined areas, including a shipping/docking area, assembly area, and area where enclosures and their constituent racks are kept.

Typically, the business process of installing and operating new computer or networking systems in the data center involves a series of independent stages. First, based on determined requirements, components of the systems are ordered through a vendor or supplier. Once the components for these systems are received, they are entered into inventory logs and "asset" tags which identify components for future reconciliation/audits are created. While the order for the components themselves may identify a number of attributes that each component should have (i.e. amount of memory, number of ports, model number etc.), the inventory systems often do not, and may only be concerned with the fact that the item was in fact received, and what the serial number or other distinguishing identifier is. Conventional asset IDs track accounting information such as depreciation, but not other attribute information.

Once a component or set of components is received it is ready to be installed in the data center. Installation is not typically performed by those employed in the receiving/warehousing department or by those who track inventory. The current environment relies on highly skilled employees for all aspects of component installation. Because such skilled workers are in short supply, the installation of new components in a data center can take weeks. Further, such installation takes a longer time because the installer must first discover the configuration and other attributes of the components. Furthermore, the operation of such components in the data center is controlled by management systems, which dictate what software is to be installed, how the components are to be connected etc. The management system is run by the administrative or Information Technology (IT) departments within a large entity such as a corporation. The management system must in turn, identify, once products are installed, what they consist of, and how to configure or operate them. This information must be discovered by the management system through agents that can communicate with the products, or entered manually into the management system by skilled operators who can inspect the component or test it to find out its attributes and configuration because the original order data and the received physical component cannot be easily correlated.

There is thus needed a more efficient operating procedure for the management system that requires less use of skilled workers and decreases the deployment time of components in a data center.

SUMMARY

What is disclosed is a method including: 1) generating an asset record containing configuration information about an asset in a management system database when a purchase order for components of said asset corresponding to said asset record is created; -2) tagging said asset when deployable with an asset identification (ID), said asset ID uniquely referring to said asset record; and 3) using said asset ID to allow a data center management system to retrieve the configuration information about said asset from said asset record during configuration and operation of said asset.

DETAILED DESCRIPTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

The invention primarily consists of recording the configuration of purchased components automatically during the purchasing process to the management system so that the manual step of component discovery is eliminated. When an order for data center components (i.e. computers, routers, switches etc.) is received by the data center, the outside of the shipping boxes will have machine-readable stickers (e.g. barcodes) containing information for the component(s) inside. These machine-readable stickers are scanned prior to unpacking. The scanned information is then sent to the order processing system and to the data center management system. The data center management system will correlate the received component with that ordered, and assign a unique asset number to the component. It will also create a machine-readable sticker with that asset number. This sticker is then affixed to the back of the component so that the management system can track it and obtain relevant information regarding it at any time. By associating this asset ID with all the attributes of the component, including plans for its assembly and deployment, an accessible record is created which makes the management system operate with greater efficiency when interacting with that component.

Figure 1:
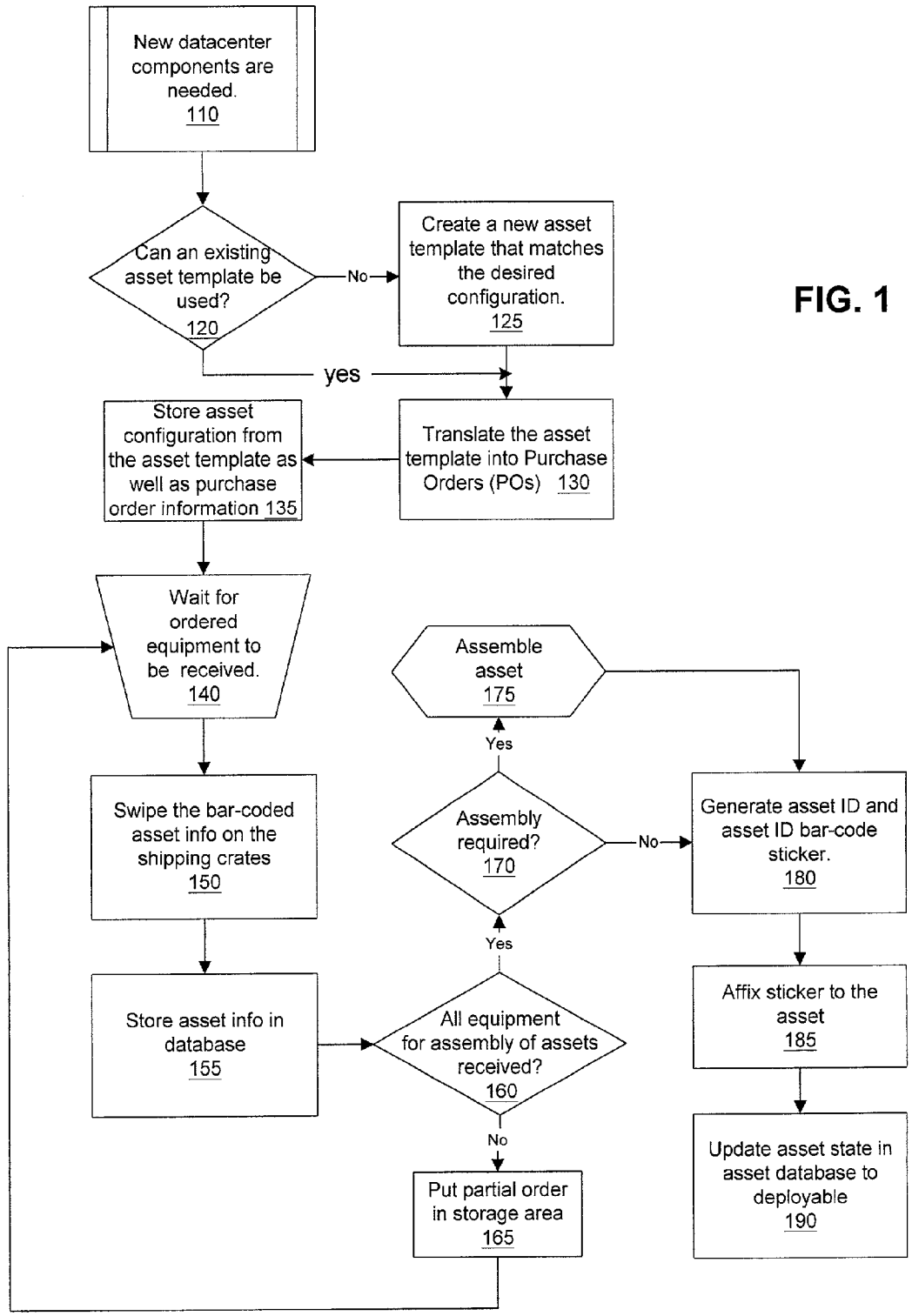
FIG. 1 is a flowchart of the primary methodology in coupling an ordering system to a management system in a data center environment.

FIG. 1 is a flowchart of the primary methodology in coupling an ordering system to a management system in a data center environment. Data center nodes (e.g. computers, switches) are seldom installed without adding additional pieces (e.g. memory, Network Interface Cards (NICs), disks). Sometimes these pieces are installed at the factory before shipment. At other times, these pieces are shipped in separate containers and are integrated into the node during installation in the data center. "Asset templates" will be used to create purchase orders for "assets" which have components for the desired configuration to be tracked. An "asset", for purposes of this description, refers to either a rack, where components are to be installed or a node within a data center. Additional new data center components are often needed when deploying assets (nodes or racks) of a data center (block 110). Based on what configuration is required, there is a check to see if an existing asset template can be used (block 120). An existing asset template will be available if an identically configured asset was ordered in the past. For instance, where a redundant backup system is to be deployed, the redundant backup system would have an identical configuration as the system it is backing up. In this case, the asset template could be reused to generate a new purchase order (PO) (block 130).

If an existing asset template cannot be used, then a new asset template that matches the desired configuration is created (block 125). In either case, the existing or new asset template is translated into a purchase order for the manufacturer, vendor or supplier (block 130). State information indicating "on order" will then be set & tracked for the assets that represent the order (not shown in FIG. 1). Once the purchase order is generated, it is transmitted to the appropriate supplier, vendor or buying agent. Information about the asset configuration from the asset template as well as purchase order information (e.g., PO number) is recorded in the asset management database (block 135). At this point, the company must wait until the ordered equipment, in part or in whole, is received (block 140). When ordered equipment is received, asset information on the shipping crates is swiped by some reader such as an optical scanner (block 150). This information consists of the purchase order number, the model/serial number of the component, and other vendor specific information describing the shipped configuration of the component. Using this information, the appropriate asset record is retrieved from the database and updated to reflect the receipt of the component. This asset information is stored in a database after being scanned/swiped (block 155). The database may be in a remote location such that the transfer of the bar code information is via some communications network. Based on a comparison of the bar-coded information to that stored when the purchase order and "plans" were created (see below), the process will next determine if all equipment required for the assembly of assets is received (block 160). If all of the equipment for assembly of the complete asset is not received, then the partial order is put in a storage area (block 165). Depending on what is delivered, items received at this stage can continue through the assembly flow. In order to put an asset in inventory, the pieces needed to configure the asset required, must be available. Thus, after placing a partial received order in storage, the assembly flow must wait for more equipment to be received (block 140). If the wrong equipment is received, or is received with the incorrect configuration, appropriate trouble tickets or return orders can be generated (not shown in figure).

If all of the equipment for assembly of the asset is received, then the asset is ready to be either assembled or asset-ID tagged. Thus, a check is performed to see if assembly is required for the received equipment (block 175). If assembly is required, then the asset is assembled from the equipment received (block 175). In either case (assembly or no-assembly), when the asset is ready (i.e. complete) such that it is deployable, an "asset ID" and an asset ID barcode sticker is generated for the asset (block 180). One property of the generated asset ID is that it be a data center-unique identifier associated with an asset. The sticker containing the asset ID is then affixed to the asset itself. As mentioned earlier, the database of the management system maintains state information regarding the asset. Since the asset is completed, its state in the asset (management system) database is updated to "deployable" (block 190). At this point, the plans for deploying the asset that were created before the equipment was ordered can be implemented since the specifics of the asset (e.g. serial number, model number) are already available to the deployer.

Figure 2:
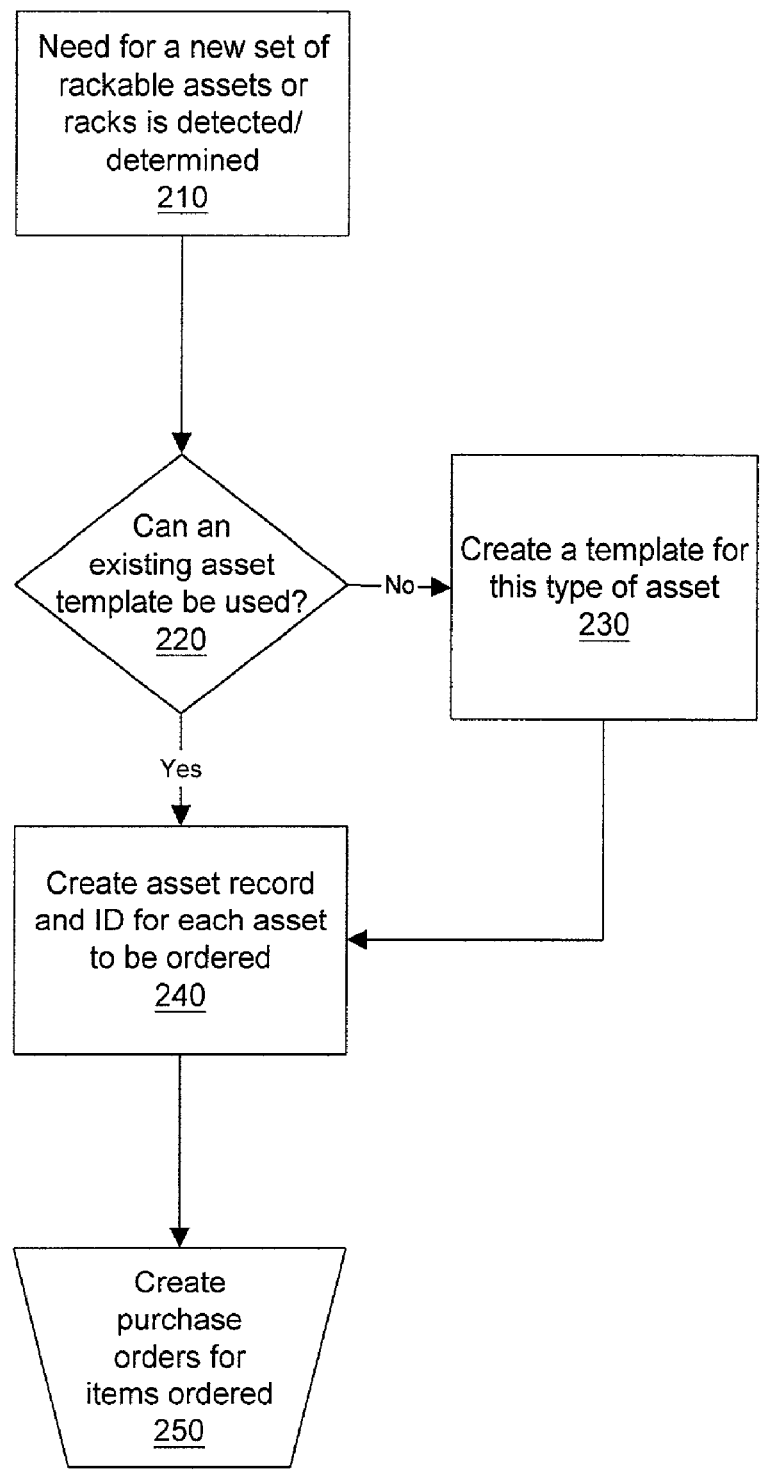
FIG. 2 is a flowchart illustrating a workflow for creating a new purchase order for an asset.

FIG. 2 is a flowchart illustrating a workflow for creating a new purchase order for an asset. The flowchart of FIG. 2 is one possible implementation of blocks 120–130 of FIG. 1. First, the need or requirement for a new set of rackable assets or entire rack is determined or detected (block 210). Normally when new rackable assets (or entire racks) are needed in a data center, especially an Internet data center, several of these assets will be ordered at once. Therefore, according to the invention, purchase order templates may be used to simplify the process of creating purchase orders. Thus, first, it is determined if an existing asset template can be used for the type of asset that is needed (block 220). If no existing template can be used, then a new template is created for the type of asset (block 230).

The base of the template is the rack-mountable asset (e.g. computer, switch) or a rack, which will eventually bear the asset ID bar code. Remaining parts of the template are those pieces that will be inserted into the chassis of the base unit (e.g. RAM, NICs, Disk) before the asset is put into service (deployed). The template will include all of the static physical descriptors of the asset (e.g. weight, length, depth, height) as well as any static resources consumed by the asset (e.g. power requirements, temperature requirements). The last piece of the template represents the soft attributes of the asset as deployed (e.g. network addresses, software). The asset as deployed will be referred to hereinafter as a "node," designating that the asset has a physical as well as topological location in relation to other deployed assets.

Using the newly created or existing asset template, an asset record and ID in the data center management database is created for each base unit that will be ordered (block 240). The asset record will include all of the static physical descriptors of the rack-mountable unit or of the rack. The asset ID is a unique identifier (unique within the data center) which can be used to track the asset. Once an asset ID is assigned and the asset record created, then purchase orders for each item that needs to be purchased separately are created (block 250). The created purchase orders will fulfill the template requirements. In accordance with he invention, the purchase orders, which ordinarily have purchase order (PO) numbers to track them, are associated in the management database, with the corresponding asset ID. By doing this prior to the items even being received, every part of the assembly and deployment process can be efficiently and definitively tracked with greatly reduced error.

Figure 3:
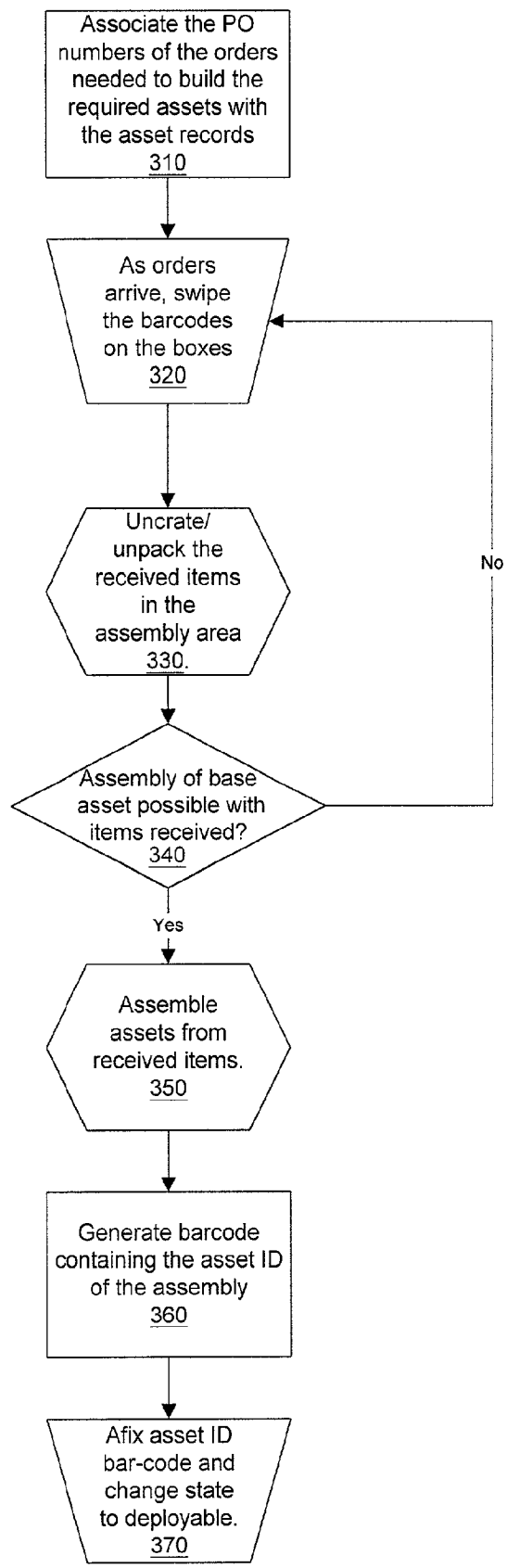
FIG. 3 is a flowchart illustrating the process of deploying an asset in accordance with one or more embodiments of the invention.

FIG. 3 is a flowchart illustrating the process of deploying an asset in accordance with one or more embodiments of the invention. The PO numbers of the orders needed to build the required assets are associated in the database with the asset records (block 310). This association will allow for automatic notification of equipment arrival and allow for a change in asset state from ordered to assembly and so on. Associating the PO numbers with the asset records through the asset ID permits any part (equipment) of the asset to be linked together virtually. From the PO, the combination of the PO number and manufacturer model number will be sufficient to tie back to the asset record.

As ordered items arrive at the data center or warehouse, the barcodes on the boxes are swiped (read) (block 320). The received items are unpacked/uncrated in a special area, usually, such as the assembly area (see FIG. 4) (block 330). After an ordered item is received and its bar-coded information swiped, a check is made to determine whether the base asset can be assembled using some/all of the presently received items together with the previously received items (block 340). If so, the asset is assembled (block 350). If not, as more orders arrive, they are swiped and this continues until there are sufficiently enough items to assemble the base asset (return to block 320).

Once the base asset is assembled, a barcode sticker containing the asset ID is generated(block 360). The barcode sticker is then affixed to the asset and the state of the asset in the database is changed to "deployable" meaning that the asset is ready to be placed in service (block 370).

Figure 4:
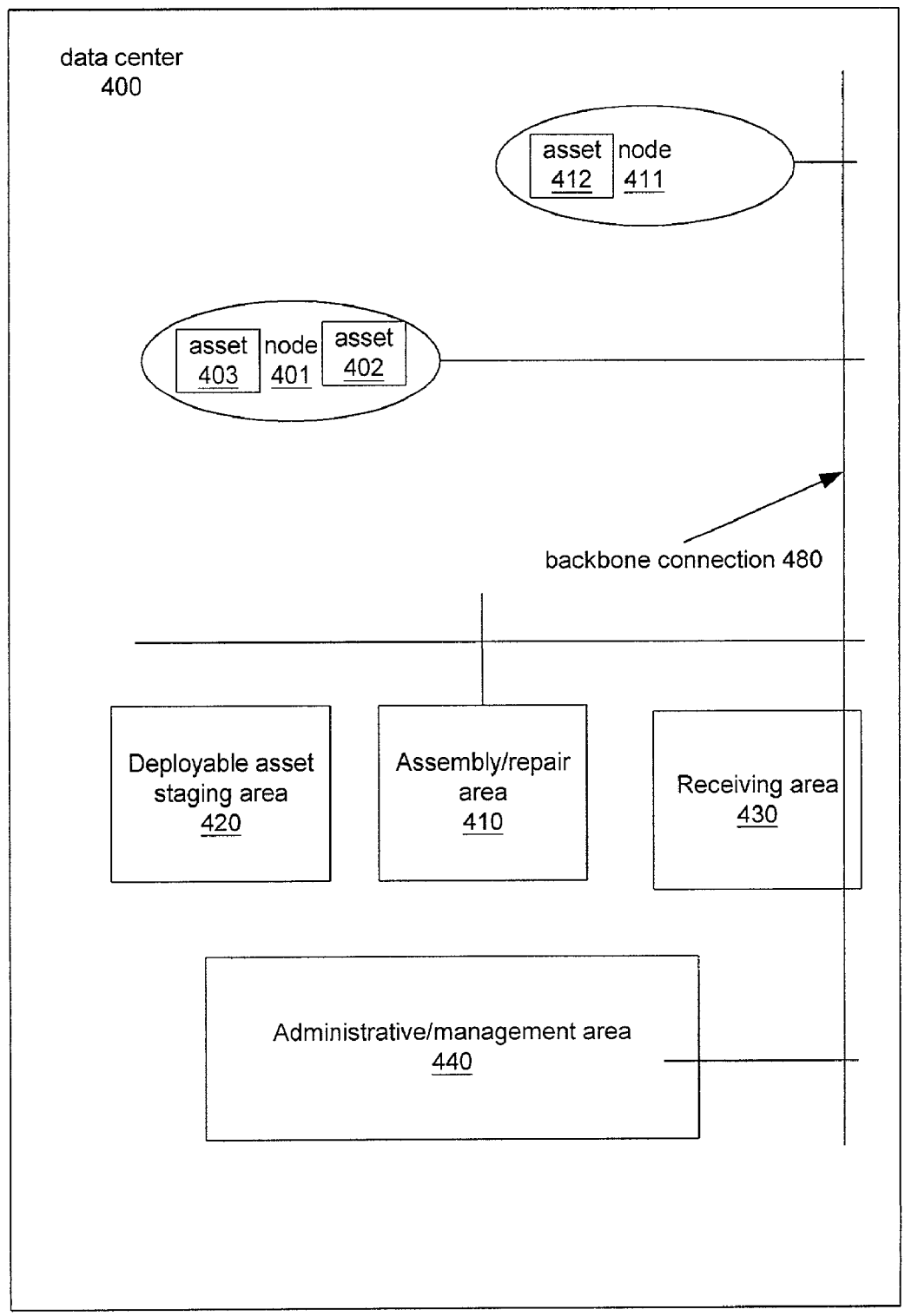
FIG. 4 illustrates the layout of a data center deployed in accordance with the invention.

FIG. 4 illustrates the layout of a data center deployed in accordance with the invention. Data center 400 may be a data center incorporating Internet web servers and other servers that are connected to the Internet or some private network. In addition, data center 400 may house network connectivity equipment such as routers and switches. As such, data center 400 is equipped with a primary "backbone" connection 480 to the Internet that has bandwidth capacity sufficient enough such that it can be shared among the many nodes operating in the data center 400. Once ordered equipment is received, it is first stored in a receiving area 430. Receiving area 430 also has a connection to the backbone connection 480 through wireline or wireless means. The boxes and crates in which the equipment is received ordinarily have bar codes that are scanned upon arrival. The list of received equipment is matched against the asset templates to decide if the received equipment can be assembled.

If the equipment can be assembled (or needs no assembly and can be deployed), it is taken next to an assembly/repair area 410. Based on the plans stored in the database, a technician would assemble the equipment together creating thereby the needed asset. The management database would then print out a barcode sticker with that asset ID. This sticker would be affixed to the back of the assembled asset and taken the staging area 420, where it awaits final deployment. After the physical assembly, installation of the asset into a rack or other mechanism and installation of software and other configuration tasks would be performed. For instance, in the case of a server, the server may have identify itself to the network, obtain an IP address, or have installed upon it operating system or server software. Such tasks can be performed in the staging area 420, but are also done on the floor of data center 400 when the asset is rack-mounted (or the rack bolted down). When such assets or group of assets are finally deployed and connected to the network (e.g. through backbone connection 480), they may be referred to as nodes.

Data center 400 shows two such nodes, node 401 and node 411. Node 401 has two assets deployed therein, asset 402 and asset 403, whereas node 411 has only one asset 411. Asset 402 may be, for example, a web server, and asset may be, for example, a caching device. Each of the assets 401, 402 and 411 will, according to the invention, have unique asset IDs assigned them, with these IDs affixed in some manner (such as on a barcode sticker). This is done as soon as the item is assembled. All configuration information such as that indicating the network virtual addresses and physical floor location of these assets, can be stored in the database and associated with the asset ID so that they can be traced/tracked at any time. Since the asset ID is also associated with other configuration information and order information (such as the model number, capacity, features, software installed etc.) of the asset, repair, upgrade, and modification of the assets are simplified in that any party can gain access to the information when needed without having to search and surmise.

Figure 5:
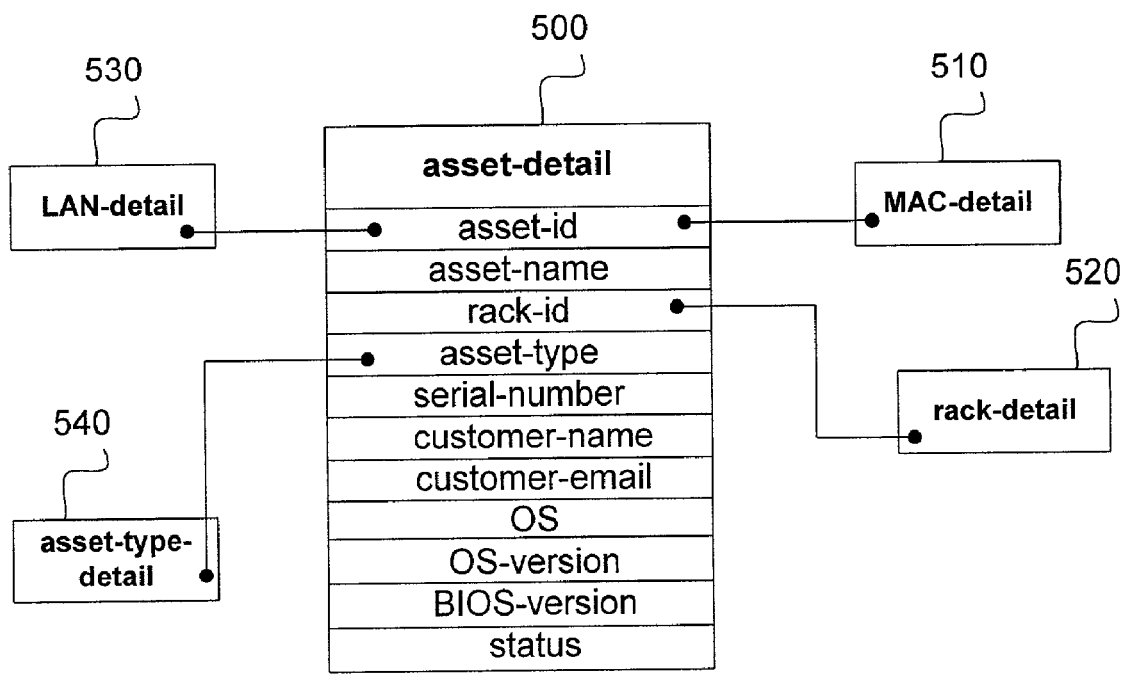
FIG. 5 is a database schema for relating asset information according to one or more embodiments of the invention.

FIG. 5 is a database schema for relating asset information according to one or more embodiments of the invention. A primary data structure called "asset-detail" 500 can be instantiated or initialized when components of that asset are first ordered. The asset-detail 500 is just one example of properties attributable to assets such as computer systems that would be deployed in a typical data center. The properties and relationships described herein are merely exemplary and may be readily modified to suit the needs of the managements system or types of assets being deployed. Asset-detail 500 contains a number of properties, among the most critical of which are the asset-id. The asset-id is a unique identifier distinguishing one asset from any others that may be encountered in the data center. One means of guaranteeing its uniqueness is to in part utilize the purchase order (PO) number that originated the asset. When an asset is first requested via a PO or other similar mechanism, there is conventionally no information transmitted to a management system. In accordance with the invention, however, the management system database can create the asset-detail 500 and assign its various properties to values based on the PO when the PO is first created.

The single asset-id, which is a "key" or unique indexing property of asset-detail 500, can then be used to track the asset through the stages of its receipt, assembly, deployment and service with respect to the data center. The asset detail 500 is a data structure that has a number of identifying properties, such as asset-id and "asset-name". Another identifying property called the "rack-id" is also a property belonging to asset-detail 500 and identifies which rack the completed asset is deployed in. The asset-type associates the asset to details of its physical structure and configuration. A particular "asset-type" will share some or all of the same "asset-detail" 540 (described below).

Other properties belonging to the asset-detail 500 include: serial-number, customer-name, customer-email, OS (Operating System), OS-version, BIOS-version (version of the Basic Input/Output System) and status. As described above, the status property holds the current state of the asset, i.e. whether it is deployable, has been deployed into service, is being assembled, is on order, etc. and can be updated when actions on an asset are taken.

Another property, identifying the asset-type, is a primary key property for a data structure asset-type-detail 540. Asset-type detail 540 contains capability and configuration information that is internal or integral to the asset. Properties such as the model number, manufacturer, amount of memory, storage capacity, number, type and speed of processors, number and type of expansion slots, number and type of ports or interfaces, power consumption and so on, may all belong to asset-type-detail 540. These properties and others allow management to more efficiently assemble, configure, update, service, deploy or otherwise administer the asset.

The asset-id is also a shared foreign key for a number of other data structures holding additional information regarding a particular asset. The first of these additional data structures is a LAN-detail 530 that is associated to the asset using the asset-id. LAN-detail 530 contains a number of properties that describe how the asset is connected to the Local Area Network (LAN) which services the data center. LAN-detail 530 contains the foreign key asset-id, linking it thereby to the asset it modifies. LAN-detail 530 also contains a VLAN-id, which identifies the asset to the virtual LAN that a data center is often a part of or sponsors, and a VLAN-name which identifies the name of the VLAN to which the asset is connected. LAN-detail 530 also contains an IP-address property which sets forth the Internet Protocol (IP) address of the Network interfaces contained in the asset. Other properties required for networking such as the netmask, which identifies the logical network for the IP address and hostname which describes the logical name used by the asset are also included in LAN-detail 530. A property called MAC, belonging to LAN-detail 530, links the LAN settings with the settings for the device (such as a network interface card) that implements the networking capability for the asset.

The MAC is a unique identifier given to every networkable device during its manufacture. A single MAC address corresponds to one and only one device in existence anywhere, whether operational or not. Thus, it can be considered a "physical" identifier of the network device. A data structure called MAC-detail 510, which is indexed by the MAC address as a key field, also contains a number of other properties. MAC-detail 510 contains two identifying properties mfg-id (identifying the manufacturer of the network device) and a foreign key of asset-id, associating the network device to the asset to which it is attached. Another field called primary-MAC, which may be Boolean, indicates whether the given device is the primary MAC device of the asset or just a secondary or back-up device. The primary MAC device is often the one that is initialized first when the asset is powered up and is often the one responsible for communicating with management systems to get dynamic configuration information such as IP addresses and boot image location for the asset. Other network properties belonging to MAC detail 510 include an IP-address, netmask, switch-port-id (the physical switch port to which this interface is connected to in the data center), a connect-to-MAC (the MAC address of the switch to which this asset is connected to), and connect-to-asset-id (the asset ID of the connected switch).

MAC-detail 510 is associated to the asset through the asset-id, while another data structure rack-detail 520 is associated with its own primary key called rack-id. The rack-id is a foreign key of asset-detail 500 and a primary key of rack-detail 520 indicating that while a rack may have more than one asset, a given asset may belong to only one rack. Rack-detail 520 contains properties describing the various physical and configuration characteristics of a particular rack. For instance, rack-detail 520 may have properties such as weight, height, width, depth, capacity, and so on. Other data structures, such as those for application packages and other software to be installed to and/or configured on the asset have not been shown, but can be readily ascertained/designed by one of ordinary skill in the art.

The various data structures and relationships depicted in FIG. 5 are intended to illustrate one possible schema for maintaining and tracking an asset completely as it progresses from receipt at the data center to being placed in service. Many other combinations of data structures and relationships may be set forth as necessary or desirable to the management system.

Figure 6:
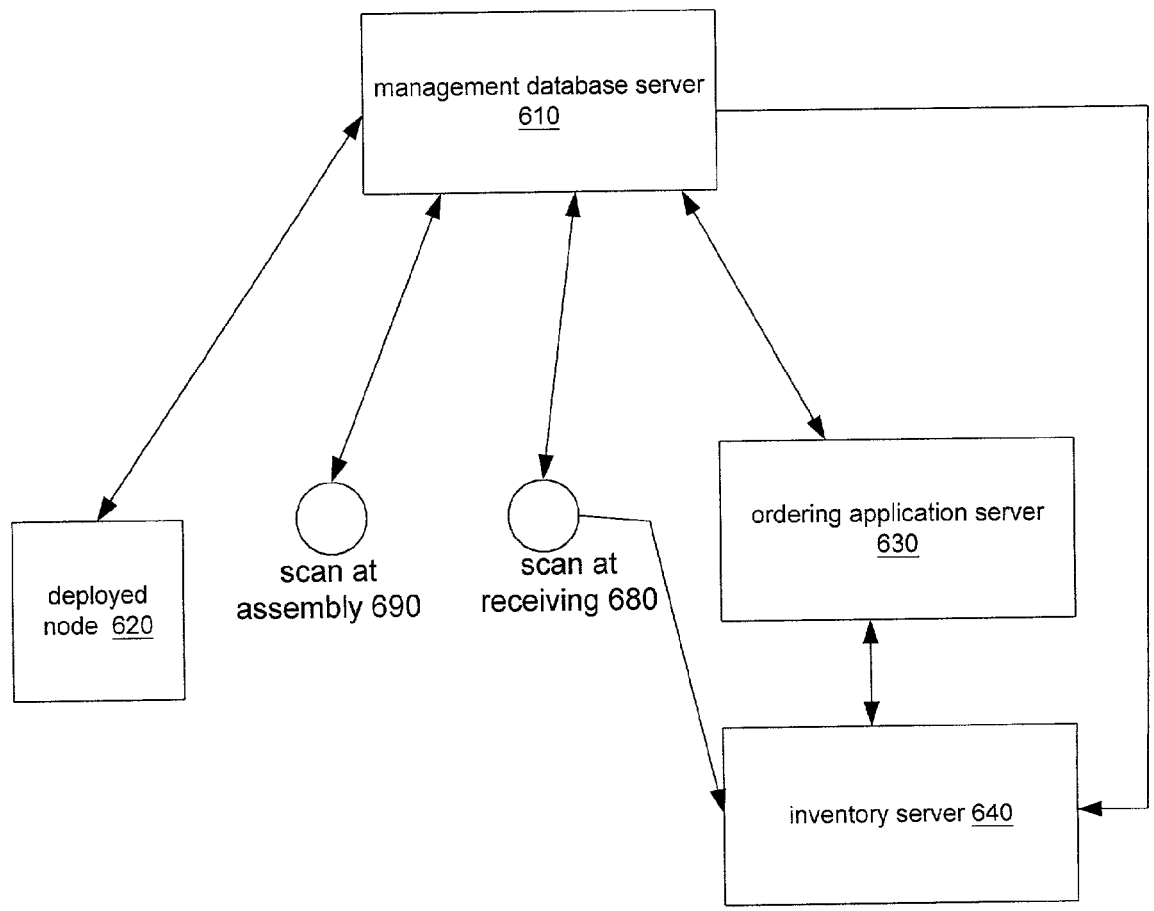
FIG. 6 illustrates the interaction among servers and a deployed node in a data center according to at least one embodiment of the invention.

FIG. 6 illustrates the interaction among servers and a deployed node in a data center according to at least one embodiment of the invention. While the below description refers to individual servers performing various different functions, the same functions could all be implemented as services and interfaces of a single physical server or device. When the need for an asset is determined it can first be ordered using an ordering application server 630. Ordering application server 630 may consist of, for instance, an interface to a online ordering system of a supplier or manufacturer as well as an application that generates purchase orders that can be printed and transmitted in other ways to a vendor. The ordering application server 630 may have the necessary asset templates that can be used to generate the purchase orders and may be capable of creating new templates if the need arises.

When the purchase order for an asset or assets is generated, the information from the appropriate template, which is designed in part to be in accordance to the database schema of the asset database, it is transmitted to an inventory server 640. The inventory server 640 tracks the asset in terms of its date of order, purchase price, date of receipt, depreciation, cost, and so on and does not really provide any valuable aide to the management information system or IT administrators with respect to deploying or servicing the asset.

According to the invention, upon creation (or approval by management etc.) of a purchase order by the ordering application server, or concurrently thereto, for each asset ordered, an asset record is instantiated in a management database server 610. Management database server 610 stores and updates the asset record and maintains, updates and stores all asset records for a data center. Management database server 610 can implement a database schema such as that depicted in FIG. 5 and serves as a central point of information access for assets in the data center. When the asset or partial equipment to assemble an asset, are received, a scan at receiving 680 is performed. The scan at receiving 680 is usually a swipe of the boxes or cartons or entry of the bill of lading/shipping invoice. The contents of scan 680 are sent to the inventory server 640 so that it can track the receipt of the items, and add them to the physical inventory list. The scan 680 is also forwarded to the management database server 610 which can talk to the inventory server 640 to determine which asset the scan refers to. Alternatively, information from the purchase order that identify the asset with an asset record (such as the PO number) could have already been part of the asset record such that the management database server 610 can recognize the asset to update the status of. The management database server 610 can determine by referring to the assembly/deployment details stored for the asset whether enough equipment has been received in order for the asset to be assembled (or deployed if not requiring assembly).

If so, the IT team or technicians can assemble the asset. At this point, the technicians assembling the asset can request that the management database server print a sticker with bar-coded asset-id information. This sticker is then affixed to the assembled asset. Another scan at assembly 690 can be undertaken to verify that the sticker has been affixed. The status of the asset, maintained on server 610 in its asset record, can be updated to deployable by the management database server 610.

Once the asset is deployed as a network "node" 620, the additional asset information, such as network addresses, software configuration, operational status, etc. can be stored, updated and tracked by the management database server 610. By associating information such as installed application package details, the IT team could discover and more efficiently service, update or configure the asset at the node 620. Since the node 620 is networked, it can contact or be contacted by the management database server 610 at any time. By associating details of which rack the asset belongs to, its precise location would always be known. This allows the deployed node 620 to be remotely configured, administered and diagnosed more effectively. The various information associated to the asset record (see FIG. 5, for instance) allow management or IT teams to have complete information about a given asset without having to physically inspect it or trace it back from the ordering process.

Figure 7:
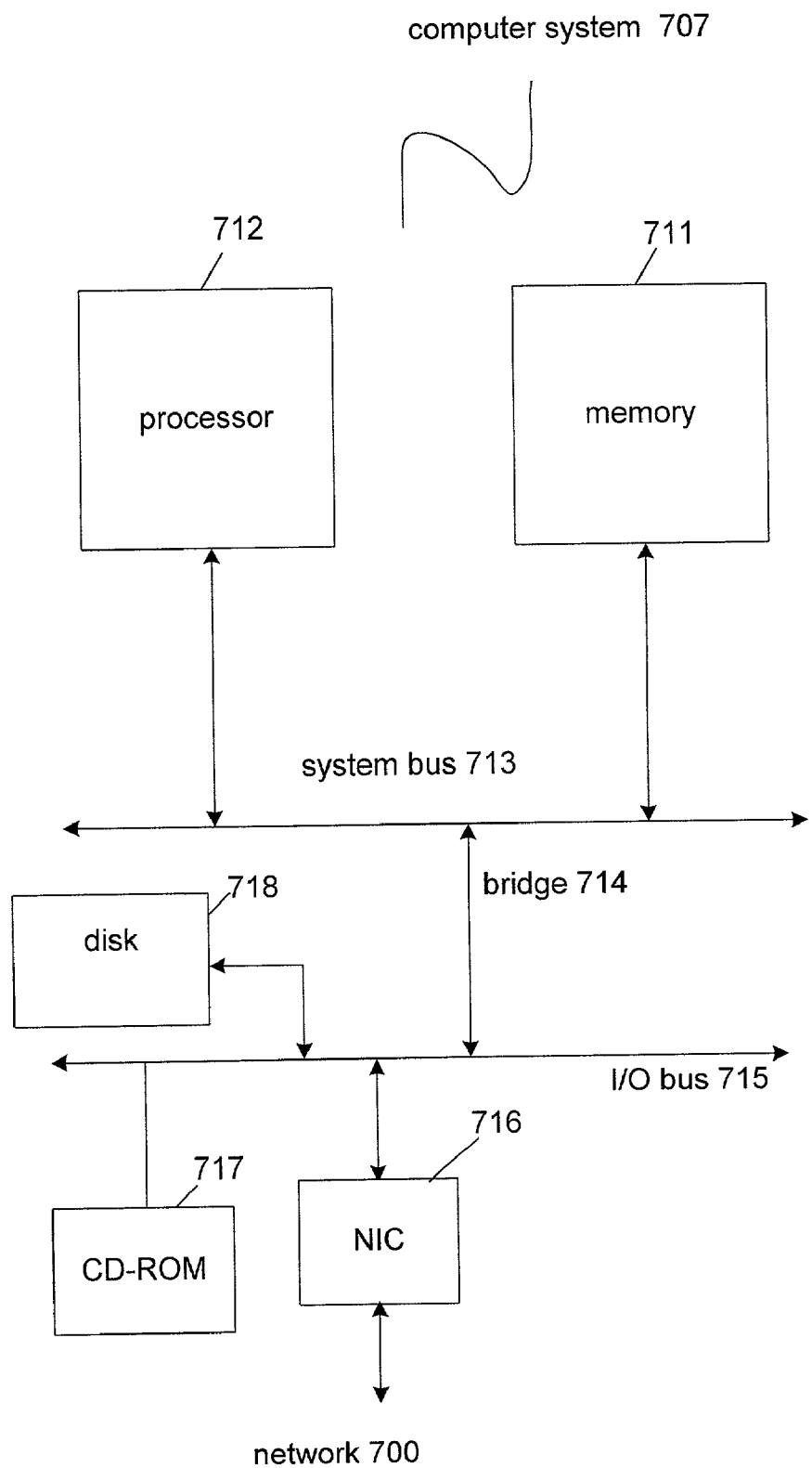
FIG. 7 is a diagram of a computer implementation of one or more embodiments of the invention.

FIG. 7 is a diagram of a computer implementation of one or more embodiments of the invention. Illustrated is a computer system 707, which may be any general or special purpose computing or data processing machine such as a PC (personal computer), coupled to a network 700. One of ordinary skill in the art may program computer system 707 to act as a management database server that is capable of maintaining, updating and associating asset records with other pertinent related information, or as an inventory server or ordering application server. According to one or more embodiments of the invention, the system 707 or systems similar to it, would be programmed to perform the following functions:

Creating new template or utilizing existing assets templates for generating purchase orders;

Associating purchase orders to asset records;

Generating a data center unique asset-id;

Creating an asset record and corresponding related data structures according to a predetermined schema;

Updating and accessing these asset records and related information when needed;

Determining if received equipment can be assembled or deployed as an asset; and

Communicating and maintaining contact with deployed nodes.

The system 707 has a processor 712 and a memory 711, such as RAM, which is used to store/load instructions, addresses and result data as desired. The implementation of the above functionality in software may derive from an executable or set of executables compiled from source code written in a language such as C++. The instructions of those executable(s), may be stored to a disk 718, such as a hard drive, or memory 711. After accessing them from storage, the software executables may then be loaded into memory 711 and its instructions executed by processor 712. The result of such methods may include calls and directives in the case that the asset records (and related information) are stored on disk 718, or a simple transfer of native instructions to the user database via network 700 if it is stored remotely. The asset records database may be stored on disk 718, as mentioned, or stored remotely and accessed over network 700 by system 707. The records may also be stored using any known database technologies.

Computer system 707 has a system bus 713 which facilitates information transfer to/from the processor 712 and memory 711 and a bridge 714 which couples to an I/O bus 715. I/O bus 715 connects various I/O devices such as a network interface card (NIC) 716, disk 718 and to the system memory 711 and processor 712. The NIC 716 allows software, such as management database server software, executing within computer system 707 to transact data, such as asset status and assigned asset-ids, to other nodes or servers connected to network 700. Network 700 is also connected to the data center or passes through the data center, so that sections thereof, such as assembly, or receiving, can communicate with system 707.

Similarly, the scanning at the receiving and assembly areas may utilize bar-code scanning, optical character recognition, or other technologies. Information may also be entered into the system by manual entry through a terminal and keyboard.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. A computer implemented method for ordering and tracking components required to assemble an asset for use in a particular data center comprising a plurality of assets, the method comprising:

creating an asset record for the asset designated for assembly, wherein the asset is comprised of a plurality of components, wherein creating the asset record comprises generating an asset identifier for the asset that is unique within the data center and distinguishes the asset from the plurality of assets in the data center;

creating a purchase order for each of the plurality of components of the asset, the asset identifier for the asset being generated based on the created purchase orders;

storing the asset record and purchase order information in a management database, wherein the stored purchase order information is associated with the asset record in the management database;

upon receiving the plurality of components along with information regarding the purchase orders of the components, retrieving and updating the asset record in the management database using the received purchase order information to reflect that the plurality of components have been received; and determining whether all components required for assembling the asset have been received, wherein each of the method steps are performed automatically, without human intervention.

2. The method of claim 1 further comprising:

transmitting the purchase orders for the plurality of components to a supplier, vendor or buying agent; and after the creating an asset record step, receiving the plurality of components along with information regarding the purchase orders of the components, wherein each of the method steps are performed by an entity that purchases the plurality of components.

3. The method of claim 1 wherein an asset template is used to create the asset record and the purchase orders.

4. The method of claim 1 wherein the asset record contains information relating to the asset including physical descriptors of the asset, resources consumed by the asset, or soft attributes of the asset.

5. The method of claim 2 wherein receiving a component comprises:
receiving a container including the component, wherein a machine-readable code has been placed on the outside of the container; and
scanning the machine-readable code, wherein the code contains information on the purchase order of the component.

6. The method according to claim 1, wherein the received purchase order information comprises a purchase order number, a model or serial number of a component, and information regarding the shipped configuration of a component.

7. The method according to claim 1, further comprising:
if it is determined that all the components required for assembling the asset have been received, assembling the asset using the plurality of components.

8. The method according to claim 7, further comprising:
after assembling the asset, deploying the asset into the data center, the deployed asset being connected to a network, wherein the management database is also connected to the network.

9. The method according to claim 7, further comprising:
after assembling the asset, generating the asset identifier in a printed form; and
affixing the printed form to the assembled asset.

10. The method according to claim 8, further comprising:
updating the asset record in the management database to include a network address, Local Area Network detail, or a MAC address for the deployed asset.

11. A computer readable medium that stores a computer program for ordering and tracking components required to assemble an asset for use in a particular data center, the computer program comprising sets of instructions for:
creating an asset record for the asset designated for assembly, wherein the asset is comprised of a plurality of components, wherein the set of instructions for creating the asset record comprises a set of instructions for generating an asset identifier for the asset that is unique within the data center and distinguishes the asset from the plurality of assets in the data center;
creating a purchase order for each of the plurality of components of the asset, the asset identifier for the asset being generated based on the created purchase orders;
storing the asset record and purchase order information in a management database, wherein the stored purchase order information is associated with the asset record in the management database;
upon receiving the plurality of components along with information regarding the purchase orders of the components, retrieving and updating the asset record in the management database using the received purchase order information to reflect that the plurality of components have been received; and
determining whether all components required for assembling the asset have been received,
wherein each set of instructions are configured to be executed automatically, without human intervention.

12. The computer readable medium of claim 11 further comprising sets of instructions for:
transmitting the purchase orders for the plurality of components to a supplier, vendor or buying agent,
wherein each set of instructions are caused to be executed by an entity that purchases the plurality of components.

13. The computer readable medium of claim 11 wherein the asset record contains information relating to the asset including physical descriptors of the asset, resources consumed by the asset, or soft attributes of the asset.

14. The computer readable medium according to claim 11, wherein the received purchase order information comprises a purchase order number, a model or serial number of a component, and information regarding the shipped configuration of a component.

15. The computer readable medium according to claim 11, wherein the asset is assembled and deployed into the data center, the deployed asset being connected to a network, wherein the management database is also connected to the network.

16. The computer readable medium according to claim 15 further comprising sets of instructions for:
maintaining contact with the deployed asset through the management database and network to service, update, configure, or diagnose the deployed asset.

17. The method according to claim 8 wherein the deployed asset comprises a computer, the method further comprising:
updating the asset record in the management database to include software configuration information of the deployed asset.

18. The method according to claim 8, further comprising:
maintaining contact with the deployed asset through the management database and network.

19. The method according to claim 8, further comprising:
servicing, updating, configuring, or diagnosing the deployed asset through the management database and network.

20. The method according to claim 19 wherein the servicing, updating, configuring, or diagnosing is performed automatically, without human intervention.

* * * * *

UNITED STATES PATENT AND TRADEMARK OFFICE
CERTIFICATE OF CORRECTION

PATENT NO.        : 7,117,169 B2                                          Page 1 of 1
APPLICATION NO.   : 09/853976
DATED             : October 3, 2006
INVENTOR(S)       : Anna M. Zara et al.

It is certified that error appears in the above-identified patent and that said Letters Patent is hereby corrected as shown below:

On the title page, in field (73), under "Assignee", in column 1, line 2, delete "LP.," and insert -- L.P., --, therefor.

Signed and Sealed this

Twenty-first Day of July, 2009

JOHN DOLL
*Acting Director of the United States Patent and Trademark Office*